April 27, 1965 D. A. GIRARD 3,180,598
TUBE CLAMPS

Filed March 27, 1963 2 Sheets-Sheet 1

INVENTOR:
DONALD A. GIRARD

April 27, 1965  D. A. GIRARD  3,180,598
TUBE CLAMPS
Filed March 27, 1963  2 Sheets-Sheet 2

INVENTOR:
DONALD A. GIRARD

United States Patent Office 3,180,598
Patented Apr. 27, 1965

3,180,598
TUBE CLAMPS
Donald A. Girard, Fair Oaks, Calif.
(10633 Charbono Way, Rancho Cordova, Calif.)
Filed Mar. 27, 1963, Ser. No. 268,495
16 Claims. (Cl. 248—68)

The invention relates to tube clamps and is particularly concerned with devices for fastening tubes to stationary support structures, and with a connection between a plurality of tubes and such structures employing such devices.

Tubes carrying liquid or gas are often installed parallel to each other; they may be all of the same or of different sizes, and the number of tubes is, in general not uniform among different installations. As the size of a tube is determined by its function and its physical location within the group of tubes is determined by its termination points, there is no predictable or uniform sequence of tube sizes within a group. Hence each installation must usually be treated individually.

Tube clamps or hold-downs of known construction have a bolt hole at each end by which they are bolted to the structure. They therefore require two bolts between adjacent tubes which are secured by aligned, terminally juxtaposed clamps. This leads to the disadvantage of necessitating more bolts to be mounted and more holes to be drilled in the structure than if there were but a single bolt between said adjacent tubes. A further drawback is that the necessary spacing between said adjacent tubes is larger than desirable, whereby the group of parallel tubes occupies more space than is convenient.

Single tube clamps having multiple recesses, for clamping several tubes, overcome the space and width drawbacks but do not permit tubes of different sizes to be fastened except when the clamps are especially designed for a specific installation, for a predetermined sequence of tube sizes. Further, they are not economically adapted to fasten any given number of tubes; unless a considerable variety of clamps with different numbers of recesses and of different lengths is provided, there will usually be unoccupied recesses, with waste of material and space, the latter involving the provision of an otherwise needlessly long support structure.

It is the general object of this invention to provide a tube fastening device which will fasten to a support structure a single tube or, by terminally juxtaposing several such devices, any desired number of parallel tubes having any pattern or sequence of sizes, using but a single bolt between adjacent single tubes. It is then only necessary to provide one shape and size of fastening device for each size of tube to be fastened.

Ancillary objects are to provide fastening devices as described which have bolting lugs at their ends, shaped so that the lugs on terminally juxtaposed devices can be bolted in overlapping relation in a way that the stress due to the bolts will have little or no tendency to bend the lugs, thereby making it possible to form the devices of metal having low tensile strength, such as cast metal; and to shape the devices so that they can be interlocked when mounted in terminally juxtaposed relation, whereby displacement of individual devices, other than that at one end of the series, is difficult or impossible without prior removal of the devices toward said one end of the series.

Another object is to provide a rigid clamping device having a recess shaped to effect a crushing force on a tube clamped thereby to effect a small deformation of the tube, e.g., whereby a tube of circular cross section is deformed to a cross section approaching an ellipse.

Still another object is to provide an improved connection between a plurality of parallel tubes and a structure which comprises two series of terminally juxtaposed devices, each device of one series being opposite a corresponding device of the other series for clamping a single tube between them, there being but a single bolt between adjacent tubes, whereby any desired number of tubes, having any fortuitous sequence of sizes, can be clamped to the structure.

Additional objects will become apparent from the following description.

In the foregoing objects the expression "single tube" was used for simplicity to describe the usual arrangement; however, it is also possible to construct the devices to clamp a set of several tubes, e.g., two tubes, adjacently to a single or between one pair of devices, and the set of tubes is, in such case, to be regarded as corresponding to the aforesaid "single tube."

In summary, each fastening device is a rigid block having an abutment face formed with a transverse recess for receiving at least a part, preferably one-half, of the tube, the block having bolting holes at the ends. According to one feature of the invention the bolt holes are formed in rigid lugs projecting from the ends of the block, said lugs being staggered with respect to said face so that lugs on adjacent, terminally juxtaposed blocks of like or similar shape can be mounted in overlapping relation, with the bolt holes in alignment, whereby a single bolt can secure both blocks. Preferably, each lug has a thickness less than that of the block and the combined thickness of the two lugs is equal to that of the block, so that bolt loading is transmitted from the bolt head to the support structure through the said lugs without imposing bending stress on the lugs in excess of that necessary to clamp the tubes.

According to another feature, the ends of the blocks are shaped so that the terminally juxtaposed lugs or the blocks are interlocked, whereby displacement of any block other than the one at the end of a series is difficult or impossible.

According to still another feature, the said recesses have depths (measured perpendicularly to said abutment face) and widths (measured along said face) such that the tube is crushed or deformed slightly. For example, in the embodiment wherein the blocks are mounted in opposed relation, each recess may have a cross section shaped as the arc of a circle of radius slightly greater than the radius of the tube to be clamped, and the depth is then slightly less than the tube radius; however, other shapes which are substantially arcs of circles, e.g., eliptical outlines with almost equal axes, may be used, all such outlines being herein, for convenience, called substantially arcs of circles or substantially segments of circles. Such an arc is preferably between 168° and 178° in length and may be formed by describing the arc of a circle from a center situated outside the plane of the abutment face a distance between about 0.01 and 0.10 times the radius of the circle. When two similar blocks are mounted with their abutment faces in engagement the resulting passage defined by their recesses has the shape of two segments of a circle, each segment having a height between about 0.40 and 0.49 times the circle diameter. Further, the said recess is preferably cylindrical, i.e., it has a continuous surface extending the full width of the block and generated by a generatrix which is parallel to said abutment face and moves on a directrix which is substantially the arc of a circle, as previously described.

While in the preferred embodiment the said abutment face is continuously flat and the opposed blocks are in engagement throughout their entire areas, this is not an essential requirement of the invention.

It is only necessary to provide one shape of block for each tube size; a pair of opposed blocks of identical shape is used for mounting each single tube when the connection uses two series of blocks, as in the preferred arrangement to be described. The blocks of different shapes may differ from each other only in the size of the recess, making it possible to substitute blocks for accommodating tubes of different sizes. While normally each block has only one tube-receiving recess, several recesses may be provided, especially for clamping tubes of small size.

The invention will be further described with reference to the accompanying drawings forming a part of this specification and showing two preferred embodiments, wherein.

Figure 1:
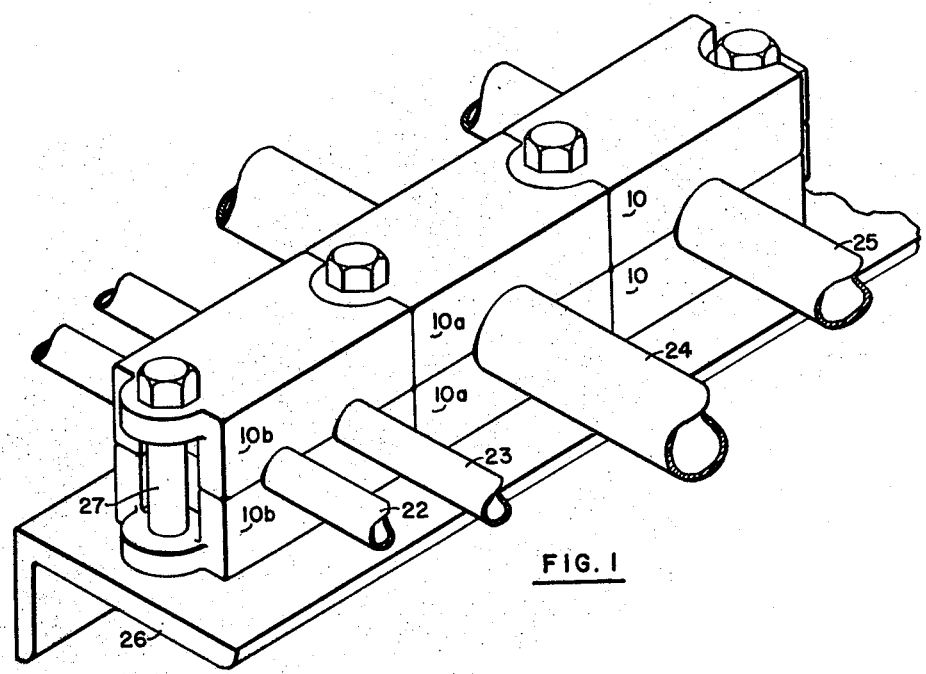
FIGURE 1 is an isometric view showing four tubes of three different sizes secured to a structure, using two series of three blocks.

Referring to FIGURE 1, the fastening device comprises a plurality of blocks 10, 10a or 10b, of identical outline and size save for the size and number of the tube-receiving recesses.

As appears in FIGURES 2–7, each block has an abutment face 11 and an outer face 12 which, in this embodiment, are parallel and both flat. The block may, for example, be of cast metal but other materials affording rigidity may be used. The abutment face 11 has formed therein an open transverse recess 13 having a cylindrical surface generated by a generatrix which is perpendicular to the drawing (FIG. 3) moved on a directrix which is the arc of a circle with radius R and center O. This center lies outside the plane of the abutment face 11 by a distance of eccentricity $e$ which may, for example, be between 0.01 and 0.10 times R. The radius R is selected to be slightly larger than the radius of the tube to be clamped, for example, between 1.001 and 1.10 times the tube radius, depending upon the selected value of $e$ and the extent to which the tube is to be deformed or crushed during clamping.

By way of a specific example, for clamping a tube of soft metal such as copper having an external diameter of 0.501 inch, to be crushed 0.0085 inch, R may be 0.260 inch and $e$ 0.014 inch.

Each block has a pair of integrally formed bolting lugs or ears 14 and 15, each having a thickness less than the thickness of the block between its faces 11 and 12 and situated in staggered relation to said faces so that the lug 14 is flush with the outer face and the lug 15 flush with the lower face. Further, the combined thickness of the two lugs is advantageously equal to the thickness of the block so that stress loading is transmitted through the several overlapping lugs, as will appear. Each lug has a bolt hole 16 or 17. As appears in FIGURES 4 and 5, the lug 14 is curved convexly at its end 18. As appears in FIGURES 3, 4 and 6, there is formed in the face 12, at the end remote from the lug 14, a recess 19 having a flat bottom and a concavely curved end wall, shaped to receive a lug 14 from a terminally juxtaposed block. The lug 15 is narrower than the block, as appears in FIGURES 4 and 6. As appears in FIGURES 3, 4 and 5, the block has, at its end remote from the lug 15, a pair of laterally spaced projections 20 which extend from the face 11 to the lug 14 and define an open recess 21, shaped to receive a narrow lug 15 from a terminally juxtaposed block. The recesses 19 and 21 thus cooperate with the lugs of terminally juxtaposed blocks to cause the blocks of a series to be interlocked. This prevents lateral displacement of individual blocks even when the bolts are removed.

Figure 2:
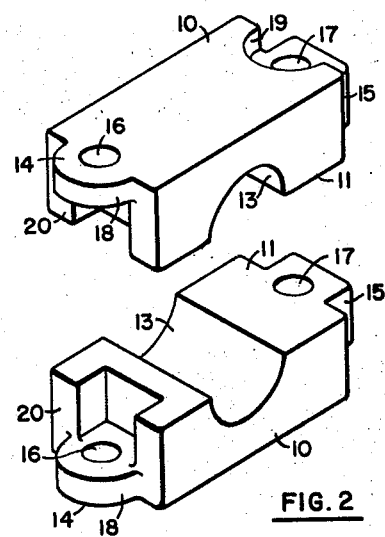
FIGURE 2 is an exploded view of two identically shaped blocks, one being inverted to show its operative relation to the other for clamping a tube.
Figure 3:
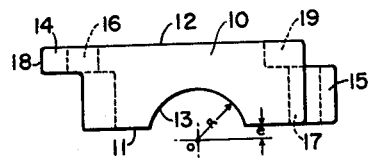
FIGURE 3 is an elevation of one block.
Figure 4:
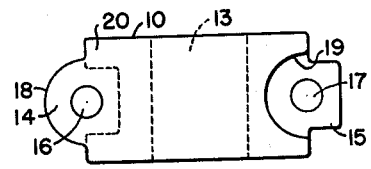
FIGURE 4 is a plan of the block of FIGURE 3.
Figure 5:
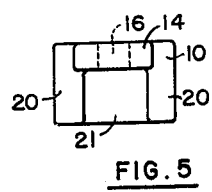
FIGURES 5 and 6 are end views of the left and right ends, respectively, of the block shown in FIGURE 3.
Figure 6:
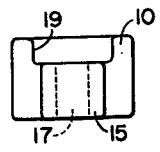

Usually but a single tube-receiving recess 13 is formed in each block. However, several such recesses may occur in one block; this is shown in FIGURE 1 in the case of the blocks 10b, which have two small recesses for clamping a pair of small-diameter pipes or tubes 22 and 23. It may be noted that the recesses 13 are normally situated off-center from the mid-point between the holes 16 and 17. Apart from attaining a stronger structure, having regard to the fact that the recesses 21 extend inward beyond the holes 16, this makes it impossible to assemble the blocks of one series reversed from their correct positions. The correct relation between a pair of blocks for clamping a tube is shown in FIGURE 2.

FIGURE 1 shows a plurality of tubes 22–25 connected to a stationary supporting structure 26 having a row of bolt holes drilled therein at intervals equal to the interval between the holes 16 and 17. A first series of blocks 10, 10a, 10b, is placed on the structure 26 with the outer block faces 12 in engagement with the structure and the blocks in interlocked, terminally juxtaposed relation, their bolt holes being aligned with the holes in the structure. The tubes are laid into the open recesses 13 and the second series of blocks is assembled with the abutment faces 11 downward, starting with the block 10b. The bolts 27 are extended through the lugs and structure and are tightened. This brings the faces 11 on opposed blocks into abutment, deforming the tubes slightly, and insuring effective clamping. The deformation of the tubes is useful for applying the necessary clamping action despite minor variations in the tube diameter.

It is evident that the number of bolts 27 exceeds the number of blocks in each series by one.

Figure 7:
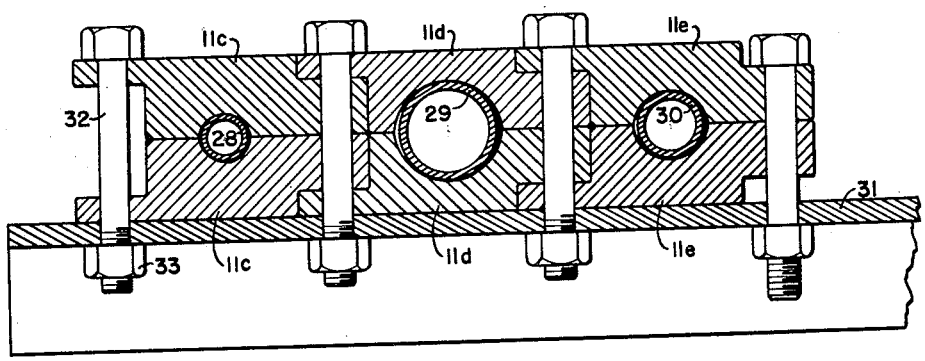
FIGURE 7 is a sectional view through a connection between a structure and three tubes of two different sizes.

FIGURE 7 shows a similar connection wherein three tubes 28, 29 and 30 are fastened to a stationary supporting structure 31 using two series of blocks, each series consisting of blocks 11c, 11d and 11e. These blocks are mounted as described for FIGURE 1. This view shows the relation of the lugs, the bolts 32 and their nuts 33 at the center line of the rows of blocks, and illustrates the tube deformation.

Figure 8:
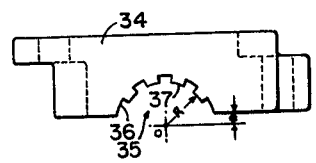
FIGURE 8 is an elevation of a block according to a modified construction.

FIGURE 8 shows a modified block 34 which is constructed as was the block 11 save for the contour of the recess 35. This recess, although geometrically cylindrical, is fluted as indicated at 36. The lands between these flutings or grooves are indicated at 37 and have surfaces spaced by the distance R from an axis O, positioned as previously described for FIGURE 3.

I claim as my invention:

1. In a device for fastening one or more tubes to a stationary structure:
   (a) a rigid block having spaced opposite faces for mounting respectively toward and away from said structure,
   (b) said block having formed in one of said faces at least one transverse recess for receiving at least a portion of said tube,
   (c) said block having at each end thereof a rigid bolting lug of height less than the distance between said faces and extending longitudinally therefrom,
      (1) said lugs having bolting holes extending therethrough perpendicularly to said faces, and
      (2) the lugs at the opposite ends of the block being staggered in relation with one lug adjacent to one of said faces and the other lug adjacent to the other face, the combined height of said lugs being not more than the distance between said faces, whereby the lug at one end can be disposed in overlapping relation to the lug at the other end of a terminally juxtaposed block of like shape with the bolting holes of the overlapping lugs in alignment.

2. A fastening device as defined in claim 1 wherein at least one of said lugs and a part of the device at the end remote from said one lug have complementary shapes, to interlock said one lug with a terminally juxtaposed block of like shape.

3. A fastening device as defined in claim 1 wherein one of said lugs is curved convexly at its outer end and the block is formed with a concave recess of complementary outline at the end remote from said one lug, for receiving a lug with a convex end of a terminally juxtaposed block of like shape.

4. A fastening device as defined in claim 1 wherein one of said lugs is narrower than the block and the block has, at the end remote from said one lug, a pair of spaced end projections which define a recess, for receiving the narrow lug of a terminally juxtaposed block of like shape.

5. A fastening device as defined in claim 1 wherein:
 (a) said one face of the block which has the recess formed therein is an abutment face adapted for abutment with another block of like shape,
 (b) said recess being shaped to receive substantially one-half of said tube.

6. A fastening device as defined in claim 5 wherein said recess has a cross section which is substantially the segment of a circle and said segment has a height slightly less than the radius of said circle.

7. A connection between a plurality of parallel tubes and a stationary structure extending transversely to said tubes, said connection comprising:
 (a) a first series of terminally juxtaposed blocks of similar shape constructed as defined in claim 6 mounted in engagement with said structure and having said abutment faces thereof directed away from said structure,
 (b) a second series of terminally juxtaposed blocks of similar shape constructed as defined in claim 6 mounted with their abutment faces in engagement with those of corresponding blocks of the first series,
 (c) a plurality of bolts, equal in number to one more than the number of blocks in one series, securing said blocks to said structure and extending through the holes in said lugs, each bolt except the two bolts at the extremities of the series extending through four bolting lugs, and
 (d) at least one tube clamped between the blocks of said series and situated partly within the recesses of corresponding blocks.

8. A connection between a plurality of parallel tubes and a stationary structure extending transversely to said tubes, said connection comprising:
 (a) a series of terminally juxtaposed blocks as defined in claim 1 mounted with said recessed faces directed toward said structure,
 (b) at least one tube for each block situated at least partly within the recess thereof,
 (c) a plurality of bolts, equal in number to one more than the number of blocks in said series, extending through all of the holes in said lugs.

9. A connection between a plurality of parallel tubes and a stationary structure extending transversely to said tubes, said connection comprising:
 (a) a first series of terminally juxtaposed blocks constructed as defined in claim 1 mounted in engagement with said structure with said recessed faces directed away from the structure,
 (b) a second series of terminally juxtaposed blocks constructed as defined in claim 1 mounted with their recessed faces in engagement with the recessed faces of corresponding blocks of the first series,
 (c) a plurality of bolts, equal in number to one more than the number of blocks in one series, securing said blocks to said structure and extending through the holes in said lugs, each bolt except the two bolts at the extremities of the series extending through four bolting lugs, and
 (d) at least one tube clamped between the blocks of said series and situated partly within the recesses of corresponding blocks.

10. In a device for fastening one or more tubes to a stationary structure:
 (a) a rigid metallic block having a flat abutment face for abutting relation with a complementary block of like shape and an outer face adapted to engage said structure,
 (b) said block having formed therein at said abutment face at least one transverse, cylindrical recess extending the full width of the block for receiving half of said tube, the generatrix of the recess surface being parallel to said abutment face and the directrix being an arc of a circle having its center situated a small distance outside the plane of said abutment face,
 (c) whereby a pair of said blocks in mutually abutting relation along said abutment faces define a cylindrical passage of cross sectional dimension perpendicular to said faces slightly less than the dimension parallel to said faces,
 (d) said block having a rigid bolting lug at each end extending longitudinally therefrom,
  (1) said lugs being of unequal thickness and the combined thickness of said lugs being substantially equal to that of the block between said faces,
  (2) one lug being flush with one of said faces and the other lug being flush with the other face, and
  (3) said lugs having bolt holes extending therethrough perpendicularly to said abutment face,
 (e) one lug, situated at one end of the block, being curved convexly at the outer end thereof, and
  (1) the block having at the other end thereof, at the same face as said one lug, a concave recess shaped to receive a lug with a convex end of a first terminally juxtaposed block of like shape, and
 (f) the other lug being narrower than the width of the block, and
  (1) the block having, at said one end thereof, a pair of end projections extending from a face thereof substantially to said one lug and defining therebetween a recess for receiving the narrow lug of a second terminally juxtaposed block of like shape.

11. A fastening device as defined in claim 10 wherein the said center of the directrix circle is situated outside said plane by a distance between 0.01 and 0.10 of the diameter of said circle.

12. A connection between a plurality of parallel tubes and a stationary structure extending transversely to said tubes, said connection comprising:
 (a) a first series of rigid blocks of similar shape disposed in terminally juxtaposed relation, each said block having
  (1) an outer face in engagement with said structure and an abutment face directed away from the structure,
  (2) at least one transverse cylindrical recess formed at said abutment face, extending the full width of the block, and shaped to receive substantially half of a tube therein, and
  (3) a rigid bolting lug at each end of each block, the lugs having thicknesses less than that of the block and the lugs at opposite ends being staggered relatively to said faces,
  (4) the lugs on adjacent blocks being in mutually overlapping relation and having aligned bolt holes extending therethrough,
 (b) a second series of rigid blocks constructed as defined in a, also in terminally juxtaposed relation but with the abutment faces directed toward the blocks of the first series,
 (c) a plurality of tubes each situated within a passage formed by recesses formed in corresponding blocks, and (d) bolts extending through said holes securing the several blocks to said structure and securing said tubes in clamped conditions.

13. A connection as defined in claim 12 wherein said recesses have dimensions, parallel to said abutment faces, slightly in excess of the diameters of the respective tubes and the combined dimensions of said passages perpendicular to said abutment faces are slightly less than the respective tube diameters.

14. A connection as defined in claim 12 wherein the lugs of all blocks of both series are disposed in overlapping relation, whereby each said bolt, save the two bolts at the extremities of the series, extends through holes in four lugs.

15. A device for clamping one or more tubes to a structure and deforming the tubes which comprises:

(a) a rigid block having an abutment face adapted for engagement with the abutment face of a block of similar shape, said block being formed with bolt holes at its ends, (b) said block having formed in said abutment face at least one transverse recess for receiving substantially one-half of a tube of circular cross section, said recess having the cross sectional outline of substantially the arc of a circle of length between 168° and 178°.

16. In a device for fastening one or more tubes to a stationary structure and deforming the tubes which comprises:

(a) a rigid block having spaced faces for mounting respectively toward and away from said structure, (b) said block having formed in one of said faces at least one transverse recess having a cross section which is substantially the segment of a circle having a height between about 0.49 and 0.40 of the diameter of said circle for receiving at least a portion of said tube, (c) said block having at each end thereof a rigid bolting lug formed with a bolting hole extending therethrough perpendicularly to said faces.

References Cited by the Examiner
UNITED STATES PATENTS

| | | | |
|---|---|---|---|
| 631,234 | 8/99 | Stevens | 248—67.5 |
| 1,126,904 | 2/15 | Stark | 59—78 |
| 2,362,124 | 11/44 | Ellinwood | 248—68 |
| 2,417,141 | 3/47 | Syfert | 59—78 |
| 2,425,033 | 8/47 | Fletcher | 248—68 |
| 2,582,384 | 1/52 | Knollman | 248—65 |
| 2,937,833 | 5/60 | Sachs | 248—49 |

FOREIGN PATENTS

| | | |
|---|---|---|
| 538,730 | 8/41 | Great Britain. |
| 544,618 | 4/42 | Great Britain. |

CLAUDE A. LE ROY, *Primary Examiner.*

FRANK L. ABBOTT, *Examiner.*